J. F. KENNELLY, Jr., AND A. DE ROBERTIS.
SPRING TIRE FOR VEHICLES.
APPLICATION FILED FEB. 14, 1919.
1,325,520.
Patented Dec. 23, 1919.
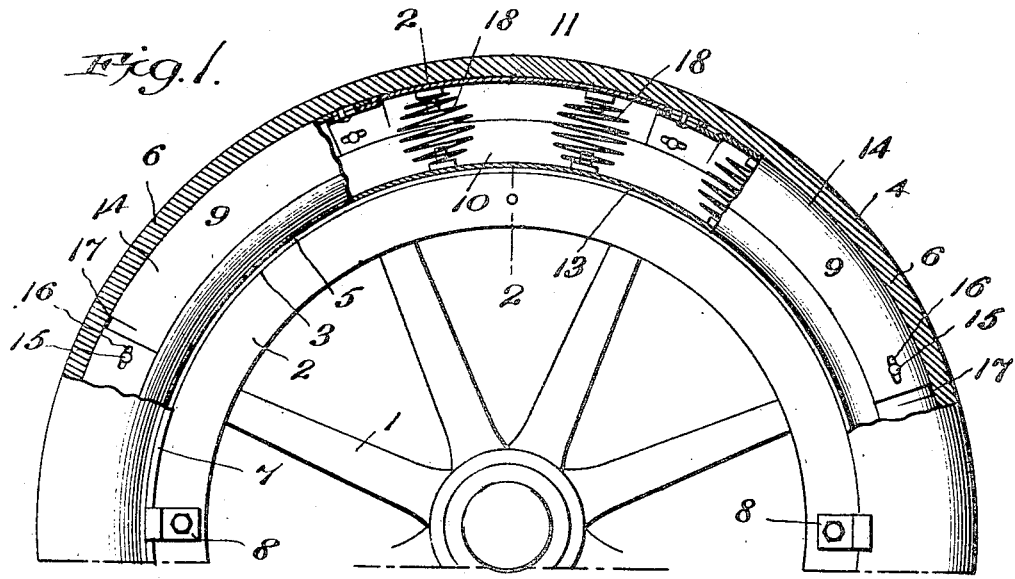
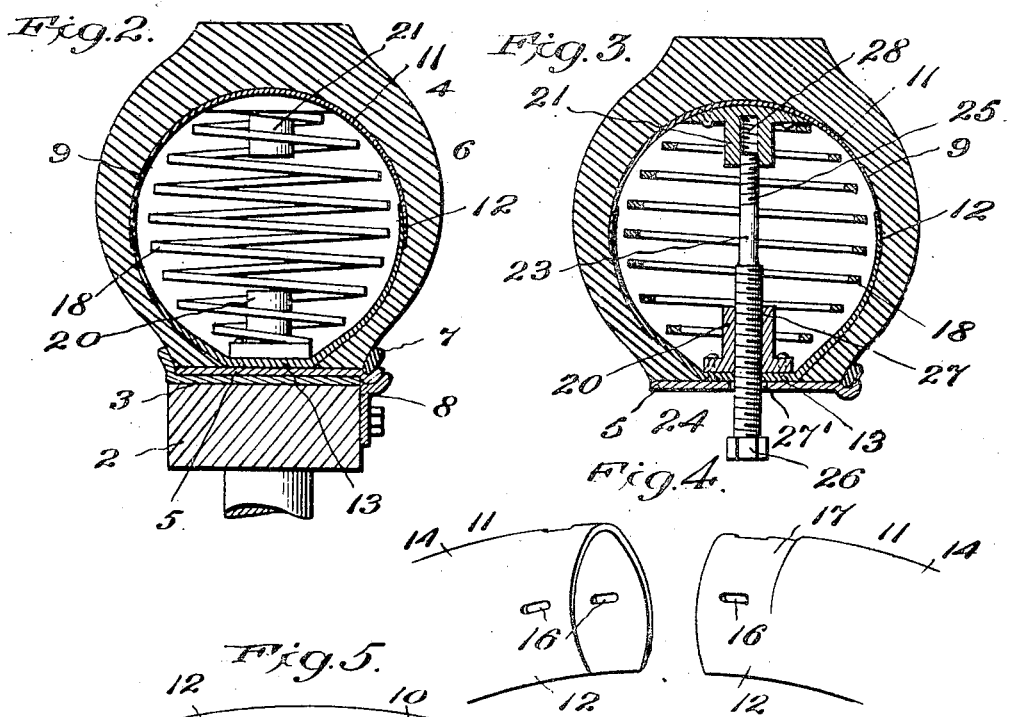
INVENTORS
J. F. Kennelly, Jr.
A. DeRobertis,
By Jas. A. Byrne
ATTORNEY

UNITED STATES PATENT OFFICE.

JOSEPH F. KENNELLY, JR., AND ATTILIO DE ROBERTIS, OF BROOKLYN, NEW YORK.

SPRING-TIRE FOR VEHICLES.

1,325,520.  Specification of Letters Patent.  Patented Dec. 23, 1919.

Application filed February 14, 1919. Serial No. 276,990.

*To all whom it may concern:*

Be it known that we, JOSEPH F. KENNELLY, Jr., and ATTILIO DE ROBERTIS, a citizen of the United States and a subject of the King of Italy, respectively, both residing at Brooklyn, in the county of Kings and State of New York, have invented certain new and useful Improvements in Spring-Tires for Vehicles, of which the following is a specification.

This invention relates to spring tires for vehicle wheels and has for its general object to do away with the use of expensive pneumatic tires in use today, and to effect a great saving of time and labor usually employed in the repairing of such pneumatic tires, and to improve the structure as set forth in our abandoned application, Serial No. 190,580, filed September 10, 1917.

Another object of the invention is to provide a tire of this character which may be readily removed and replaced on the felly of a wheel without the use of any other than the usual instruments employed in the repair of automobile tires. And to these ends the invention resides in forming a tire of this class, comprising a demountable rim to which is secured an outer shoe or casing, and, in arranging within such a casing a metallic tube, comprising a pair of sections telescopically arranged within each other and held in spaced relation by a plurality of coil springs.

To these ends the invention further consists in the novel details of construction and combination of parts more fully hereinafter described and particularly pointed out in the claims.

Referring to the drawings forming a part of this specification, in which like numerals designate like parts in all the views:

Figure 1 is a view of a segmental portion of a vehicle wheel showing the invention applied thereto and with parts broken away for the sake of clearness.

Fig. 2 is a cross-sectional view taken on the line 2—2 of Fig. 1.

Fig. 3 is a cross-sectional view of the invention showing the means for contracting the tube.

Fig. 4 is a perspective view of a portion of the outer or tread section of the tube and Fig. 5 is a perspective view of a portion of the inner or base section of the tube.

Referring to the drawings in detail, the reference numeral 1 designates the wheel, 2 the felly provided with the band, 3 and 4 the improved tire secured thereon.

The tire comprises a demountable rim 5, to which is secured the outer shoe or casing 6. Any suitable well known means may be employed for detachably securing the casing to the rim, but for the purpose of illustration the rim is shown provided at one side with the usual form of split locking ring 7 which coöperates with the rim 5, as shown, to secure the casing thereon. The usual type of clamps 8, mounted on one side of the felly and engaging the rim of the tire, are provided for securely locking the tire to the felly.

Arranged within the casing is a metallic tube 9. This tube occupies substantially the same space as is now occupied by the present form of pneumatic tube in use today and comprises an inner or base section 10 and an outer or tread section 11. These sections are substantially of semi-circular shape in cross section and are arranged so that their tapering sides 12 will telescope one within the other when the tire is in use. The inner section 10 is preferably formed of a single piece in the shape shown, and is provided with a flattened or base portion 13 which rests on the outer face of the demountable rim 5 when the tire is assembled. The outer or tread section 11 is formed of a plurality of arcuate sections 14, which overlap and telescope one within the other at their end portions and are connected together by means of rivets 15 operating in the slotted openings 16. To provide a neat connection at the tread portions of the sections, it will be noted that each of the sections has one of its end portions depressed as at 17 so as to permit the straight portion of the next section to fit snugly therein.

A plurality of coil springs 18, for giving the desired resiliency to the tire, are mounted within the tube 9. These springs are spaced at suitable intervals apart around the tire and are arranged for holding the tube sections in spaced relation to each other. Each of the springs has its end portions fitted over studs 20 and 21 formed on the tube sections as shown.

To permit the tire to be assembled it is obvious that some means must be employed for contracting the springs to telescope the tube sections so as to facilitate the removal and replacement of the outer shoe or casing 6 on the rim 5. This means is shown herein in the form of a plurality of screws 23, provided with a right hand threaded portion 24, a left portion 25 and an enlarged headed portion 26. These screws are adapted to pass through openings 27' arranged in the demountable rim 5 and to enter the threaded openings 27 and 28 provided in the studs 20 and 21. When it is desired to remove the casing from the rim, and, assuming that the demountable rim has first been removed, from the band on the felly in the usual manner, it is necessary only for a number of the screws to be inserted into the openings provided therefor at different places around the tire. An operator then utilizes an ordinary wrench for manipulating the screws, first tightening up on one then another until the tube sections have been telescoped sufficiently to permit the removal of the casing therefrom.

It is obvious, from the foregoing, that by the use of a tire constructed in accordance with our invention, a comparatively simple, cheap and inexpensive substitute may be employed for the expensive pneumatic tire in use today.

It is obvious that those skilled in the art may vary the details of construction and arrangement of parts without departing from the spirit of our invention, and therefore, we do not wish to be limited to such features, except as may be required by the claims.

What we claim is—

1. A vehicle tire comprising a rim, an outer casing mounted on the rim, a metallic tube arranged within the casing and comprising inner and outer sections substantially semi-circular in cross-section and telescopically arranged one within the other, said inner section formed of a single piece, and having a flattened or base portion resting on the outer face of the rim, said outer section formed of a plurality of arcuate sections telescopically arranged at the end portions and a plurality of springs mounted within the tube and arranged for holding the inner and outer sections in spaced relation to each other.

2. A vehicle tire comprising a rim, an outer casing mounted on the rim, a metallic tube arranged within the casing and comprising inner and outer sections substantially semi-circular in cross-section and telescopically arranged one within the other, said inner section formed of a single piece, and having a flattened or base portion resting on the outer face of the rim, said outer section formed of a plurality of arcuate sections telescopically arranged at the end portions and a plurality of springs mounted within the tube and arranged for holding the inner and outer sections in spaced relation to each other, and means for telescoping said sections for the purpose set forth.

In testimony whereof we have signed our names to this specification, in the presence of two subscribing witnesses, this seventh day of February, 1919.

JOSEPH F. KENNELLY, Jr.
ATTILIO DE ROBERTIS.

Witnesses:
V. H. JACOBSON,
J. N. JACOBSON.